3,325,712
MOTOR CIRCUIT UTILIZING TRANSFORMER ACTION BETWEEN MOTOR WINDINGS
Thomas W. Stone and Manley R. Seelhof, Owosso, Mich., assignors to Controls Company of America, Melrose Park, Ill., a corporation of Delaware
Filed Feb. 1, 1965, Ser. No. 429,489
5 Claims. (Cl. 318—220)

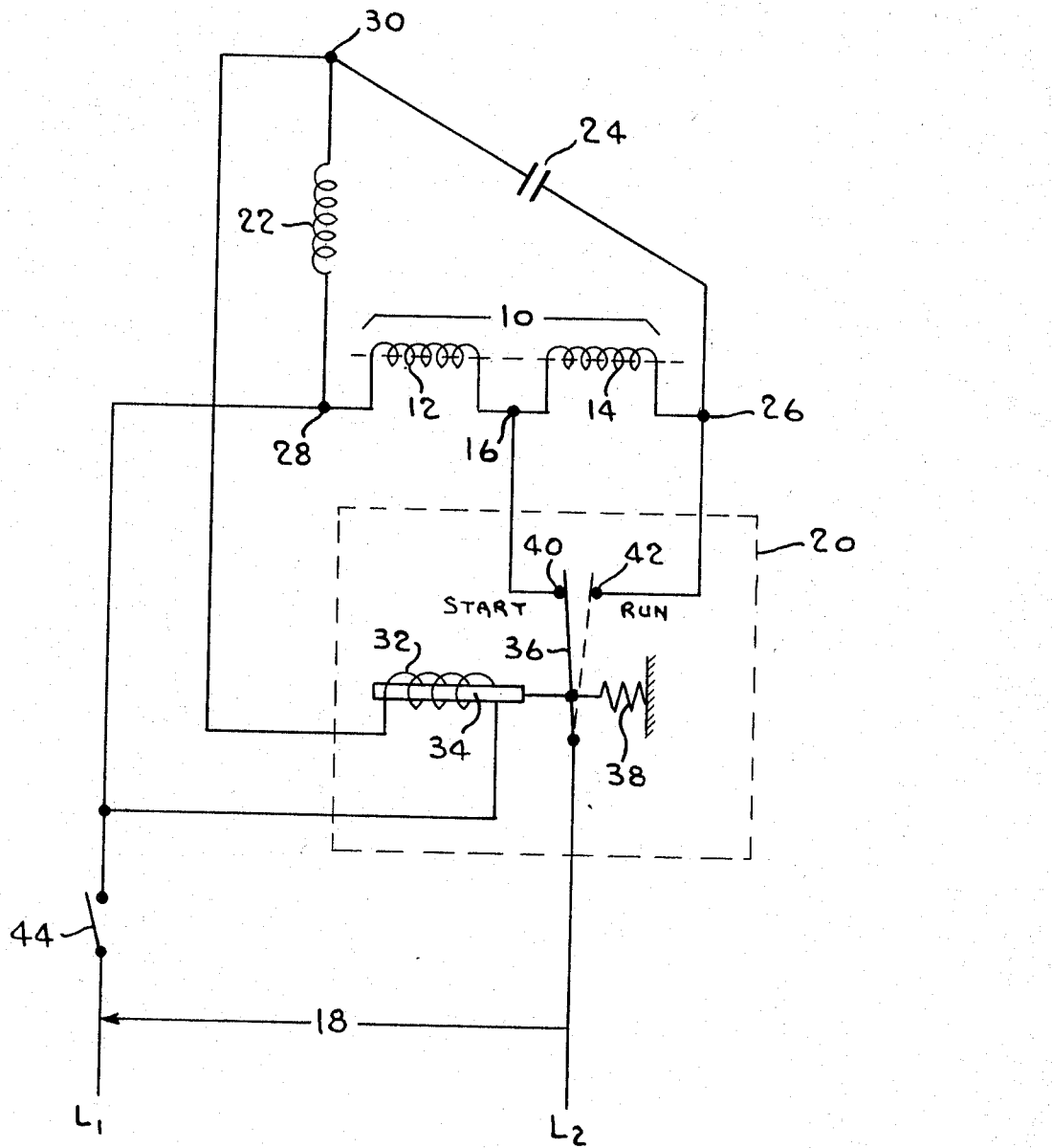

This invention relates to electric motor circuits and, more particularly, to a motor circuit adapted to increase the starting torque of permanent split capacitor motors and the like. Such motors exhibit desirable running characteristics but provide relatively low starting torque. This low starting torque has placed a mechanical limitation on the use of these motors in certain applications.

An object of this invention is to increase the starting torque of permanent split capacitor motors and the like.

For the achievement of this and other objects, this invention proposes a main winding circuit and switch arrangement for a permanent split capacitor motor whereby under start conditions source voltage is applied to only a portion of the main winding with the remainder of the main winding being included in a closed electrical circuit including the auxiliary winding and a phase shifting capacitance. The two portions of the main windings are inductively related in the motor and a transformer action occurs between the two main winding portions. The voltage induced in the portion of the main winding in the closed circuit containing the auxiliary winding is additive with the line voltage and the voltage across the main and auxiliary winding is approximately twice source voltage thereby increasing starting torque. When the motor has reached a prescribed run speed the switch is operated and switches the main winding circuit to place source voltage across the entire main winding. This terminates the transformer action to place only source voltage across the main and auxiliary winding thereby establishing a run condition.

Other objects and advantages will be pointed out in, or be apparent from, the specification and claims, as will obvious modifications of the embodiment shown in the drawing which consists of one figure comprising an electric circuit of a portion of a permanent split capacitor motor.

This invention is illustrated and will be discussed in connection with a permanent split capacitor motor (which except for the start-run circuit of this invention can be of conventional construction so that only the circuit has been illustrated in the drawing) but it will be appreciated that it is conceivable that the circuit could have application beyond that specifically illustrated and discussed and therefore this invention should not necessary be limited to such motors.

With particular reference to the drawing, the main energizing winding 10 is separated into electrically separable coils 12 and 14 by junction 16. It will be appreciated that coils 12 and 14 can be two distinct coils connected through a common junction 16 or can be part of a common coil with junction 16 being a tap connection. The main winding is preferably included in the motor stator and cooperates with a rotor, of conventional construction and therefore not shown, to produce rotation. The number of turns in coils 12 and 14 can be equal or varied as desired, but for the purpose of this discussion coils 12 and 14 will be assumed to include an equal number of turns. Voltage from source 18 is applied to main winding 10 through switch assembly 20 in a manner to be discussed more completely hereinafter.

Auxiliary winding 22 and phase shifting capacitor 24, which preferably provides a fixed capacitance, are connected across main winding 10 in a conventional manner. That is, one side of capacitor 24 is connected to one end of the main winding at junction 26, one side of auxiliary winding 22 is connected to the other side of the main winding through junction 28, and the capacitor and auxiliary winding are connected through common junction 30.

Switch assembly 20 is preferably in the form of a voltage sensitive relay including relay coil 32 connected, with respect to source 18, in parallel with auxiliary winding 22 so that the voltage on the relay coil corresponds to the voltage appearing across the auxiliary winding. Relay armature 34 is operatively connected to switch arm 36 and cooperates with spring 38 to control movement of the switch arm and cause it to selectively engage either switch contact 40 or 42. Switch arm 36 is connected to one side of source 18 and contacts 40 and 42 are connected to junctions 16 and 26, respectively, so that the relay switch is operative to apply source voltage either across the entire main winding or only portion 12 thereof.

In operation and with the above discussed arrangement, switch arm 36 is preferably biased into engagement with contact 40 by spring 38 and, when the motor is started, the voltage on coil 32 is insufficient to operate the relay switch so that a circuit is made through junction 16 and source voltage appears across coil 12. Starting of the motor can be controlled in any suitable manner as for example through switch 44. It will be noted that, although the relay switch in this position places source voltage only across coil 12, coil 14 is still included in a closed electrical circuit containing capacitor 24 and auxiliary winding 22. In accordance with conventional construction coils 12 and 14 are inductively linked in the physical motor structure, e.g. they are connected in the same iron circuit in the motor stator as illustrated by the dotted line in the drawing, so that a transformer action occurs between the coils as a result of which a voltage approximately equal to source voltage is induced in coil 14, some allowance being made for losses within the coils. The induced voltage is out of phase with the source voltage, preferably 180° out of phase, and is additive with source voltage so that the voltage between points 26 and 28, and correspondingly across the main winding, is approximately twice source voltage. This voltage between points 26 and 28 determines the voltage which appears across the auxiliary winding so that, rather than place the normally expected low starting voltage across the auxiliary winding, the voltage across the auxiliary winding is relatively higher. This increased voltage achieves an increase in starting torque. Motors incorporating the circuit of this invention have exhibited starting torques 2–2½ times greater than their running torque and up to approximately 4 times the starting torque obtained from similar motors with conventional starting circuits.

After the motor is started and approaches its run speed, the voltage on auxiliary winding 22 increases. This increase in voltage is preferably used to control switching of the main winding from its start condition discussed above to a run condition. More particularly and as was previously discussed, relay coil 32 is connected across the auxiliary winding so that the voltage on the relay coil corresponds to that on the auxiliary winding and at a preselected voltage relay armature 34 is moved against the force of spring 38 to move switch arm 36 from contact 40 to contact 42. This establishes the run circuit to the main winding through junction 26 rather than through junction 16. This switching terminates the transformer action and applies only source voltage across the entire main winding and the auxiliary winding. It will be noted that relay switch 20 is speed responsive in the sense that the voltage across the auxiliary winding is determined by the speed of the motor, but the motor remains in a run condition until the motor is de-energized. It will be appreciated that this invention is not necessarily limited to the use of a voltage sensitive relay to accomplish the switching from start to run circuit conditions, for example a centrifugal switch could be used if desired.

Although but one embodiment of the present invention has been illustrated and described, it will be apparent to those skilled in the art that various changes and modifications may be made therein without departing from the spirit of the invention or from the scope of the appended claims.

We claim:

1. A permanent split capacitor motor circuit comprising, in combination,
    a main winding divided into first and second portions electrically connected through a common junction and inductively related in the same iron circuit of the motor,
    an auxiliary winding circuit connected across said main winding and including an auxiliary winding and phase shifting means,
    a voltage source,
    means connecting one side of said main winding to a voltage source,
    and switch means for completing an electrical circuit from said voltage source to said main winding and having a first position completing a circuit to said main winding through said common junction to place source voltage on said first main winding portion and a second position completing a circuit from said voltage source across both said first and second winding portions to place source voltage on all of said main winding, said switch means being operated in accordance with the speed of said motor and assuming said first position when said motor is starting to apply said source voltage across only said first winding portion and to connect said second winding portion in a closed electrical circuit including said auxiliary winding and phase shifting means so that a transformer action occurs between said first and second winding portions and induces a voltage in said second portion which is additive with said source voltage and results in a greater than source voltage appearing across said main winding and said auxiliary winding, said switch means operative further to assume said second position when said motor reaches a predetermined run speed to terminate said transformer action so that source voltage is applied across said main winding and said auxiliary winding.

2. The combination of claim 1 wherein said phase shifting means comprises a capacitance characterized in that it shifts the voltage phase 180°.

3. The combination of claim 1 wherein said switch means is voltage sensitive and is connected across said auxiliary winding to respond to the voltage across said auxiliary winding and switch from said first position to said second position when the voltage across said auxiliary winding has increased to a predetermined value.

4. A motor start circuit comprising, in combination,
    a main winding,
    an auxiliary winding connected across said main winding,
    a voltage source,
    switch means for connecting said main winding to said voltage source and controlled in accordance with the operative state of said motor and having a run and start position corresponding to motor run and start conditions, respectively, said switch means in said start position connecting said voltage source across a portion only of said main winding, the remainder of said main winding being electrically connected to said portion of said main winding when said switch means is in its start position to maintain a closed electrical circuit including said remainder of said main winding and said auxiliary winding, said main winding portion and the remainder of said main winding being inductively related and sharing common magnetic flux to produce a transformer action therebetween when said switch means is in its start position to generate a voltage in the remainder of said main winding which is additive to said source voltage so that a voltage greater than said source voltage is placed on said main winding and auxiliary winding and said switch means operative in said run position to connect said voltage source across all of said main winding and terminating said transformer action to place only source voltage on said main winding and auxiliary winding.

5. The combination of claim 4 including phase shifting means in circuit with said auxiliary winding and connected therewith across said main winding.

References Cited

UNITED STATES PATENTS

| | | | |
|---|---|---|---|
| 1,894,124 | 1/1933 | Schaefer | 318—221 |
| 1,922,806 | 8/1933 | Heinrich | 318—221 |
| 2,033,047 | 3/1936 | Morrill | 318—221 |
| 2,084,058 | 6/1937 | Lyden | 318—221 |
| 2,705,770 | 4/1955 | Suhr | 318—225 |
| 2,864,986 | 12/1958 | Hutchins et al. | 318—220 |

ORIS L. RADER, *Primary Examiner.*

G. Z. RUBINSON, *Assistant Examiner.*